US012718789B2

(12) United States Patent
Wichern et al.

(10) Patent No.: US 12,718,789 B2
(45) Date of Patent: Aug. 25, 2026

(54) INFERENCE-TIME CONTROL OF TRANSFORMERS FOR AUDIO GENERATION

(71) Applicant: Mitsubishi Electric Research Laboratories, Inc., Cambridge, MA (US)

(72) Inventors: Gordon Wichern, Cambridge, MA (US); Junghyun Koo, Cambridge, MA (US); François G Germain, Quincy, MA (US); Sameer Khurana, Brookline, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 334 days.

(21) Appl. No.: 18/606,578

(22) Filed: Mar. 15, 2024

(65) Prior Publication Data

US 2025/0292760 A1 Sep. 18, 2025

(51) Int. Cl.

*G06F 17/00* (2019.01)
*G06F 3/04847* (2022.01)
*G06F 3/16* (2006.01)
*G10K 15/02* (2006.01)

(52) U.S. Cl.

CPC ......... *G10K 15/02* (2013.01); *G06F 3/04847* (2013.01); *G06F 3/165* (2013.01)

(58) Field of Classification Search

CPC ..... G10K 15/02; G06F 3/04847; G06F 3/165; G06N 3/044; G06N 3/045; G06N 3/047; G10H 1/0025; G10H 2250/311

USPC ............................................................ 700/94

See application file for complete search history.

(56) References Cited

U.S. PATENT DOCUMENTS

2021/0326660 A1* 10/2021 Krishnan ............. G06V 10/454
2025/0104692 A1* 3/2025 Lovelace ................ G06N 3/02

OTHER PUBLICATIONS

Copet: "Simple and Controllable Music Generation" (Year: 2023).*
Li, K., Patel, O., Viégas, F., Pfister, H., & Wattenberg, M. (2023). Inference-Time Intervention: Eliciting Truthful Answers from a Language Model. arXiv preprint arXiv:2306.03341.
Castellon, R., Donahue, C., & Liang, P. (2021). Codified audio language modeling learns useful representations for music information retrieval. arXiv preprint arXiv:2107.05677.
Kreuk, F., Synnaeve, G., Polyak, A., Singer, U., Défossez, A., Copet, J., . . . & Adi, Y. (2022). Audiogen: Textually guided audio generation. arXiv preprint arXiv:2209.15352.

* cited by examiner

*Primary Examiner* — Carolyn R Edwards
*Assistant Examiner* — Paul C Mccord
(74) *Attorney, Agent, or Firm* — Gene Vinokur

(57) ABSTRACT

An audio system for synthesizing audio sounds having a desired audio trait executes an autoregressive generative audio transformer trained for generating the audio by processing inputs with multiple layers employing multi-head attention, and uses directional inference-time intervention (ITI) to push at least some outputs of at least some heads of the multi-head attention into a direction predetermined for the desired audio trait.

19 Claims, 19 Drawing Sheets

185 186 187 188

| **Audio trait** | **head** | **direction** | **classifier** |
|---|---|---|---|
| Audio trait1 | head01 | direction11 | classifier11 |
| Audio trait1 | head02 | direction21 | classifier21 |
| Audio trait1 | head03 | direction31 | classifier31 |
| Audio trait2 | head01 | direction12 | classifier12 |

FIG. 1G

Smaller Probe Spread Weight

Larger Probe Spread Weight

INFERENCE-TIME CONTROL OF TRANSFORMERS FOR AUDIO GENERATION

TECHNICAL FIELD

The present disclosure relates generally to training and/or using audio-generative models, and more particularly to adapting the inference of pre-trained audio-generative models to generate audio having a desired audio trait.

BACKGROUND

The introduction of audio-generative models possessing the ability to generate realistic sound clips on demand has the potential to revolutionize the work with audio. For example, an autoregressive generative audio transformer (AGAT) is a type of model architecture used for generating audio waveforms. It is based on the transformer architecture, which was originally introduced for natural language processing tasks but has been adapted for various sequence generation tasks, including audio synthesis. Autoregressive transformers process discrete inputs (e.g., a sequence of text tokens representing musical notes, phonemes, or text), where autoregressive means that during inference, the model generates one token or group of tokens at a time, conditioning on previously generated tokens. In addition to an autoregressive transformer, AGAT models also include an encoder-decoder architecture, where the encoder converts an audio signal into a sequence of discrete tokens prior to input to the autoregressive transformer, and the decoder converts discrete audio tokens predicted by the transformer back into audio signals. The autoregressive nature of AGAT models allows the generation of audio samples with variable length.

AGAT models can be trained using autoregressive likelihood estimation techniques, such as teacher forcing or autoregressive sampling. These techniques involve training the model to predict the next audio sample given the previous samples and then using the predicted sample as input to generate the next sample, and so on. However, training the audio-generative models is a difficult and expensive process. Currently, most state-of-the-art generative audio transformers require customized hardware, large (often non-public) datasets, and large sums of money and energy to train.

Dynamic control of an audio signal can be considered a fundamental job of most audio professionals. Musicians may need to precisely control their instruments, recording studio engineers manipulate various controls to achieve a desired result, and smartphone users position their phone's microphone near a sound source and at an appropriate input gain when capturing a video.

It is desired to adapt the audio-generative models for dynamic control of the synthesized audio. In addition, it is desired to adapt an audio-generative model to generate audio having a desired audio trait without costly retraining of the audio-generative model.

SUMMARY

It is an object of some embodiments to adapt an audio-generative model to generate audio having a desired audio trait without a need to retrain the audio-generative model. Examples of audio traits include adding or removing scratchiness to the sound, adding characteristics present in outdoor audio recording, adding rhythmic sound, etc.

Additionally or alternatively, it is an object of some embodiments to provide a system and a method allowing control of the inference of the autoregressive generative audio transformer (AGAT) to generate audio having a desired audio trait. Additionally or alternatively, it is an object of some embodiments to provide such a system and a method that enables dynamic control of the generative audio transformers for multiple different audio traits without a need to retrain the audio-generative model of the transformer.

AGAT is a deep neural network with multiple layers employing multi-head attention. Specifically, the generative audio transformer processes input audio tokens over multiple layers whose main computational component is a multi-head self-attention block. Each head in multi-head self-attention learns a different projection of the input, and the outputs of each head are concatenated before going through the remaining processing in the layer. These individual attention heads are the network computation blocks attending to different audio characteristics of the generated audio.

Some embodiments are based on realizing that the desired audio trait in the synthesized audio can be introduced by pushing the outputs of at least some of the heads generated at some instances of time into a predetermined direction dependent on the desired audio trait. The direction can be learned offline using data-processing techniques, such as machine learning, linear regression, etc. Notably, different audio traits are associated with different directions determined, e.g., individually and/or independently, for at least some of the heads of the multi-head attention. Each direction of each audio trait can be applied to the output of a head either individually or collectively with other directions allowing to generate audio with multiple desired characteristics.

Some embodiments are based on the understanding that the desired directional push can be introduced by adding bias to the output of the attention heads. For example, because self-attention uses matrix operations, a bias vector can be used to shift the output of a layer or neuron of the self-attention block. This bias vector can be added element-wise to the output of the layer or neuron before applying the activation function. The bias vector for a specific audio trait can be learned to have a fixed predetermined direction, but fixed or varying length.

Inference-time intervention (ITI) refers to a technique used in machine learning models to intervene or modify the output of the model during the inference phase based on certain criteria or conditions. ITI can be applied while the model generates its prediction but before the final output is presented to the user or system. Some embodiments are based on recognizing that ITI can be used to inject the directional biases, e.g., biased vectors, to the outputs of attention heads making the ITI of some embodiments a directional ITI.

Some embodiments are based on the understanding that for some practical applications, it is undesirable to apply a directional bias to outputs of all heads of all layers of the transformer at each instance of time, i.e., processing each of the audio tokens. Due to the principles of audio-generative models employing AGAT, different heads have different sensitivity to different audio traits. Also, again due to the principles of AGAT employing contextual generation of audio samples (i.e., previously generated samples or audio tokens, become the context for subsequently generated samples), if a head sensitive to the audio trait is always affected by the directional bias, the accumulative effect of the directional ITI can lead to undesirable effects.

To address this issue, some embodiments employ spatiotemporal ITI that uses a spatiotemporal selection of the heads to be injected with biases. A spatial dimension of the spatiotemporal ITI prevents injecting the bias in all of the heads in all of the layers of the trained AGAT model and selects a subset of the heads for the desired audio traits. Notably, different subsets can be selected for different audio traits. The temporal dimension of the spatiotemporal ITI prevents injecting the bias in the heads all the time. In such a manner, the negative effect of disturbing the pre-trained audio generation model with excessive biases is reduced.

Some embodiments are based on realizing that the heads for a particular audio trait can be selected in advance using data analysis of outputs of the heads or dynamically during the inference stage of the audio system. For example, some embodiments train a classifier, e.g., in a supervised manner, to classify outputs of different heads as sensitive or insensitive to the particular audio trait. For example, some embodiments run positive and negative examples of audio traits through the autoregressive generative audio transformer to check the sensitivity of the heads to the audio trait and/or to train a classifier to estimate the likelihood of outputs of a head to possess the particular audio trait. During the execution of the audio system, the classification of the outputs of the heads can be used to estimate the need and the extent of directional ITI.

Different embodiments use the classification in a soft and/or hard manner. For example, some implementations do not apply directional ITI when the likelihood of the output of a head already having the desired audio trait is above a threshold, i.e., more than 50%. Some embodiments apply the directional ITI all the time but the extent of the application, e.g., the length of the bias vector, depends on the likelihood. For example, the length of the bias vector pushing outputs having a 30% likelihood of possessing the desired audio trait is more than the length of the bias vector pushing outputs with having 60% likelihood. Some embodiments use a combination of these approaches, by not applying directional ITI to the outputs already having the desired audio trait with high likelihood, and applying the directional ITI to other outputs by varying the length of the bias vector based on the likelihood of the classification.

Accordingly, one embodiment discloses an audio system for synthesizing audio sounds having a desired audio trait, including: a processor coupled to a memory storing instructions implementing executable modules of the audio system, the modules comprising: an input interface configured to collect inputs for synthesizing audio and data indicative of a desired audio trait in the synthesized audio; an autoregressive generative audio transformer trained for generating the audio by processing the inputs with multiple layers employing multi-head attention; an audio trait tuner configured to use directional inference-time intervention (ITI) to push at least some outputs of at least some heads of the multi-head attention into a direction predetermined for the desired audio trait; and an output interface configured to output the audio generated by the autoregressive generative audio transformer.

Another embodiment discloses a method for synthesizing audio sounds having a desired audio trait, wherein the method uses a processor coupled with stored instructions implementing steps of the method, including: collecting inputs for synthesizing audio and data indicative of a desired audio trait in the synthesized audio; executing an autoregressive generative audio transformer trained for generating the audio by processing the inputs with multiple layers employing multi-head attention; using directional inference-time intervention (ITI) to push at least some outputs of at least some heads of the multi-head attention into a direction predetermined for the desired audio trait; and outputting the audio generated by the autoregressive generative audio transformer.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1G shows a mapping between different elements of the embodiments according to some implementations.

DETAILED DESCRIPTION

Figure 1A:
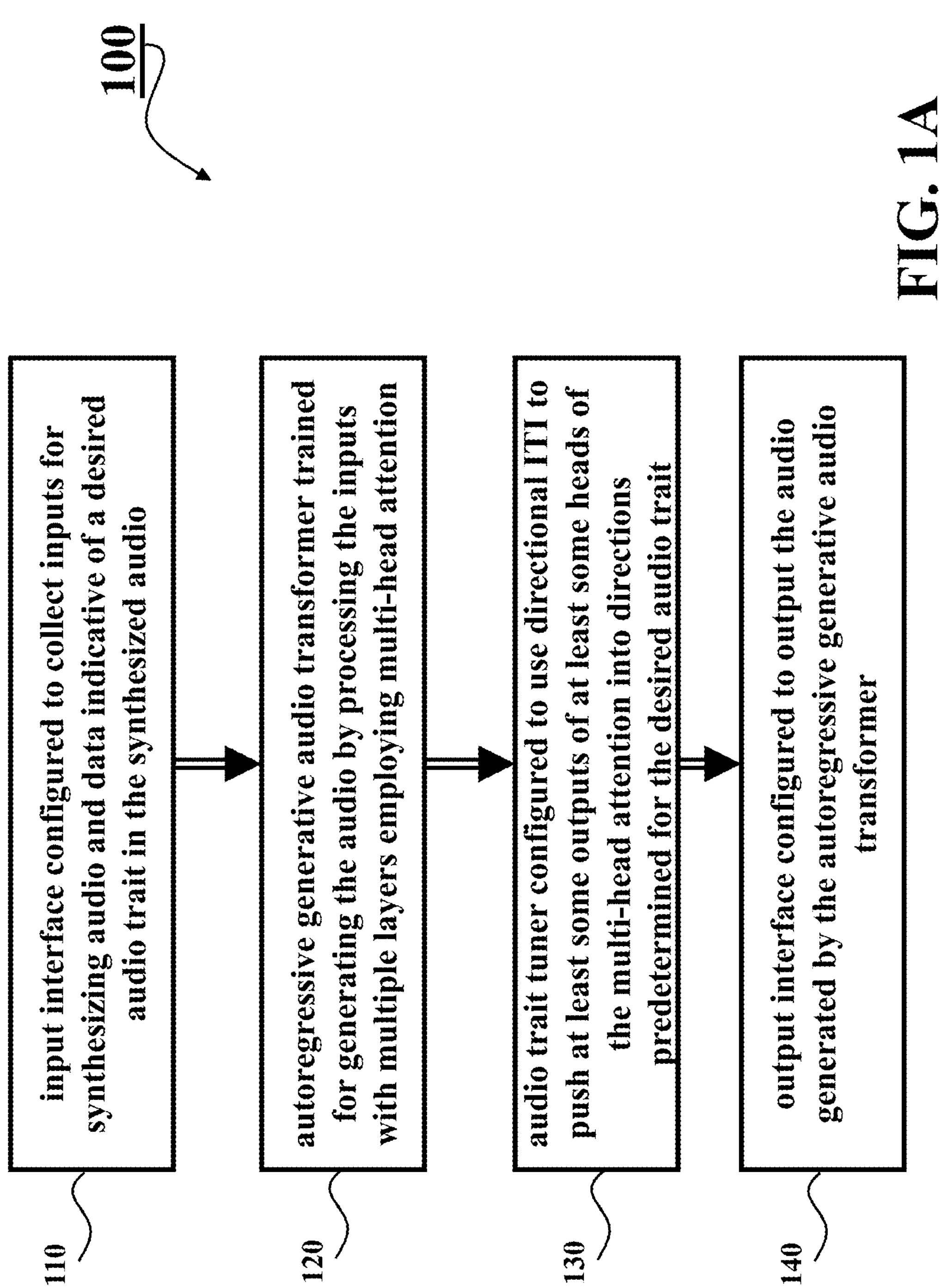
FIG. 1A shows a block diagram of an audio system for synthesizing audio sounds having a desired audio trait according to some embodiments.

FIG. 1A shows a block diagram of an audio system 100 for synthesizing audio sounds having a desired audio trait according to some embodiments. The audio system 100 includes a processor coupled to a memory storing instructions implementing executable modules of the audio system.

The modules of the audio system 100 include an input interface 110 configured to collect inputs for synthesizing audio and data indicative of a desired audio trait in the synthesized audio; an autoregressive generative audio transformer 120 trained for generating the audio by processing the inputs with multiple layers employing multi-head attention; an audio trait tuner 130 configured to use directional inference-time intervention (ITI) to push at least some outputs of at least some heads of the multi-head attention into directions predetermined for the desired audio trait; and an output interface 140 configured to output the audio generated by the autoregressive generative audio transformer.

System 100 allows to adapt the audio-generative model 120 to generate audio having a desired audio trait without a need to retrain the audio-generative model. Examples of audio traits include adding scratchiness to the sound, adding characteristics present in outdoor audio recording, adding rhythmic sound, etc. Doing so in such a manner enables dynamic control of the generative audio transformers for multiple different audio traits without a need to retrain the audio-generative model of the transformer.

Some embodiments are based on realizing that the desired audio trait in the synthesized audio can be introduced by pushing the outputs of at least some of the heads generated at some instances of time into a predetermined direction dependent on the desired audio trait. The direction can be learned offline using data-processing techniques, such as machine learning, linear regression, etc. Notably, different audio traits are associated with different directions. Each direction of each audio trait can be applied to the output of a head either individually or collectively with other directions allowing to generate audio with multiple desired characteristics.

Figure 1B:
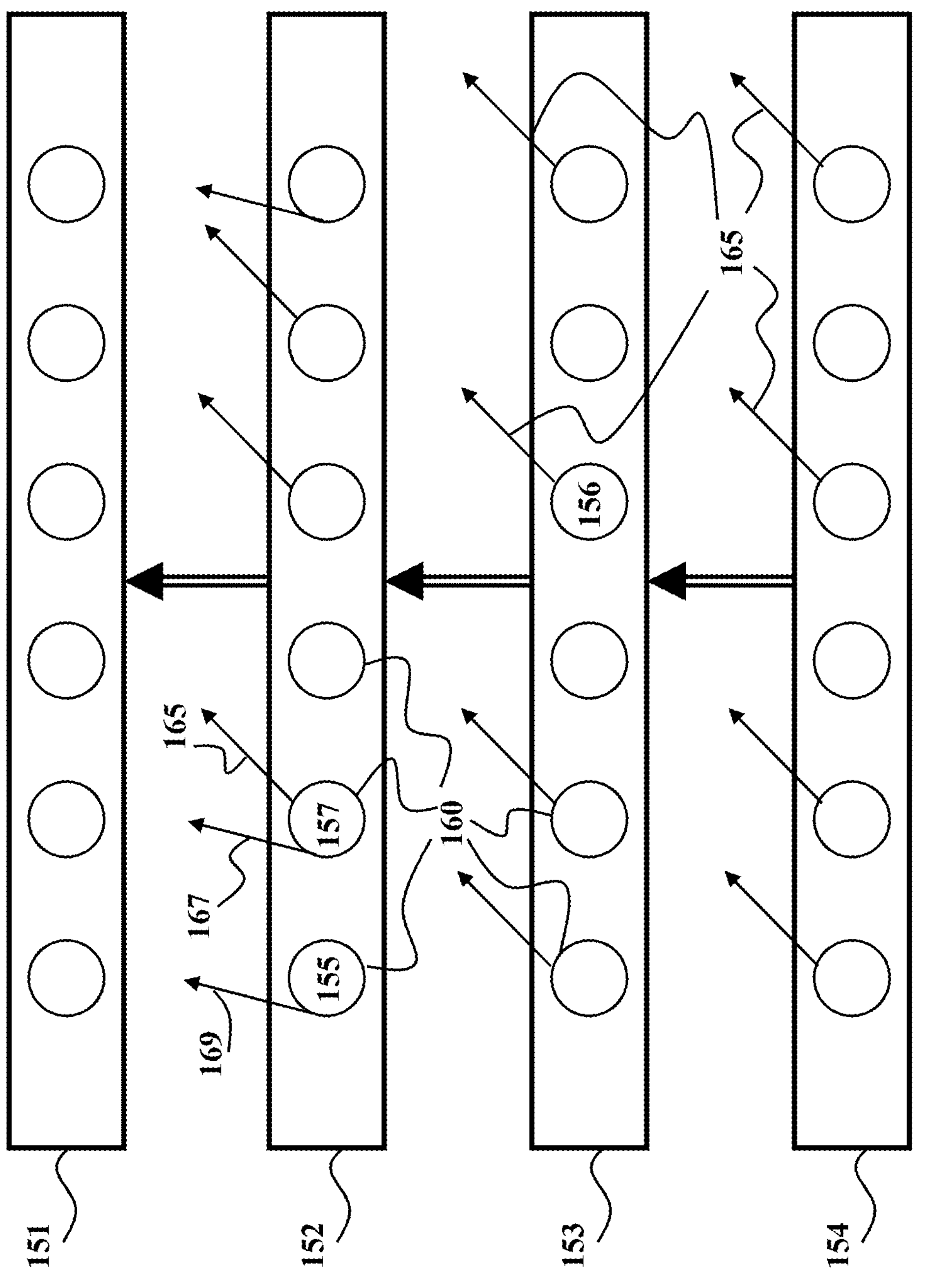
FIG. 1B shows a schematic of an autoregressive generative audio transformer (AGAT) trained for generating the audio by processing the inputs with multiple layers employing multi-head attention according to some embodiments.

FIG. 1B shows a schematic of an autoregressive generative audio transformer 120 (AGAT) trained for generating the audio by processing the inputs with multiple layers employing multi-head attention according to some embodiments. AGAT is a deep neural network with one or more layers, e.g., layers 151, 152, 153, and 154, employing multi-head attention. Specifically, the generative audio transformer processes input audio tokens over multiple layers whose main computational component is a multi-head self-attention block illustrated in FIG. 1B as circles 160. Each head in multi-head self-attention learns a different projection of the input, and the outputs of each head are concatenated before going through the remaining processing in the layer. These individual attention heads are the network computation blocks attending to different audio characteristics of the generated audio.

Some embodiments are based on the understanding that the desired directional push can be introduced by adding a directional bias 165 to the output of the attention heads. For example, because self-attention uses matrix operations, a bias vector can be used to shift the output of an attention head in the self-attention block. This bias vector 165 can be added element-wise to the output of the attention head before the projection matrix that combines all attention heads in the layer and the remaining non-linear processing for that layer.

The bias vector for a specific audio trait can be learned to have a fixed predetermined direction for different executions of the transformer 120. For example, for a first audio trait, the directions 165 can be learned offline using, e.g., machine learning and/or data-driven techniques. For a different, e.g., a second, audio trait, direction 167 can be learned offline.

In various embodiments, the directions are predetermined for each of the at least some heads according to the desired audio trait and hence can be different for each of the heads. For example, for the same desired audio trait, the direction 167 predetermined for head 157 can be different from the direction 169 predetermined for head 167.

Notably, the embodiments enable a selection of one or multiple of the plurality of audio traits, e.g., a first and a second audio trait. The push toward directions 165 and 167 can be applied to the outputs of different heads 155 and 156, or to the output of the same head 157. In these embodiments, each of the audio traits is associated with a set of directions predetermined for a set of heads, wherein the multiple audio traits include a first audio trait associated with a first set of directions predetermined for a first subset of heads and a second trait associated with a second set of directions predetermined for a second subset of heads, wherein the first subset of heads is different from the second subset of heads, wherein the first and the second subsets of heads include a first head and a second head with different directions predetermined for the first and the second audio trait.

Inference-time intervention (ITI) refers to a technique used in machine learning models to intervene or modify the output of the model during the inference phase based on certain criteria or conditions. ITI can be applied while the model generates its prediction but before the final output is presented to the user or system. Some embodiments are based on recognizing that ITI can be used to inject the directional biases, e.g., biased vectors, to the outputs of attention heads making the ITI of some embodiments a directional ITI.

Some embodiments are based on the understanding that for some practical applications, it is undesirable to apply a directional bias to outputs of all heads of all layers of the transformer at each instance of time, i.e., processing each of the audio tokens. Due to the principles of audio-generative models employing AGAT, different heads have different sensitivity to different audio traits. Also, again due to the principles of AGAT employing contextual generation of audio samples (i.e., previously generated samples or audio tokens become the context for subsequently generated samples), if a head sensitive to the audio trait is always affected by the directional bias, the accumulative effect of the directional ITI can lead to undesirable effects.

To address this issue, some embodiments employ spatiotemporal ITI that uses a spatiotemporal selection of the heads to be injected with biases. A spatial dimension of the spatiotemporal ITI prevents injecting the bias in all of the heads in all of the layers of the trained AGAT model and selects a subset of the heads for the desired audio traits. Notably, different subsets can be selected for different audio traits. The temporal dimension of the spatiotemporal ITI prevents injecting the bias in the heads all the time. In such a manner, the negative effect of disturbing the pre-trained audio generation model with excessive biases is reduced.

For example, in some embodiments, the audio trait tuner 130 selects a subset of heads producing outputs sensitive to the desired audio trait and sparsely applies the directional ITI to the selected heads by skipping applying the directional ITI to the selected heads at some instances of time. For example, as shown in FIG. 1B, the directional bias 165 is applied to the output of a head 156, but not applied to the output of the head 155. The selection of heads in time and space can be done deterministically, randomly, or in a combination thereof. For example, in one embodiment, the audio trait tuner uses a deterministic selection and applies the directional ITI to a selected head unless the directional ITI has been applied to a predetermined number of previous outputs of the selected head. In such a manner, at some executions, the output of the head 156 is modified with bias before generating audio sound, while in some other executions, the output is left as is.

Some embodiments are based on realizing that the heads for a particular audio trait can be selected in advance using data analysis of outputs of the heads or dynamically during the inference stage of the audio system. For example, some embodiments train a classifier, e.g., in a supervised manner, to classify outputs of different heads as sensitive or insensitive to the particular audio trait. For example, some embodiments run positive and negative examples of audio traits through the autoregressive generative audio transformer to check the sensitivity of the heads to the audio trait and/or to train a classifier at least for the sensitive heads to classify the likelihood of outputs of a head to possess the particular audio trait. During the execution of the audio system, the classification of the outputs of the heads can be used to estimate the need and the extent of directional ITI.

Figure 1C:
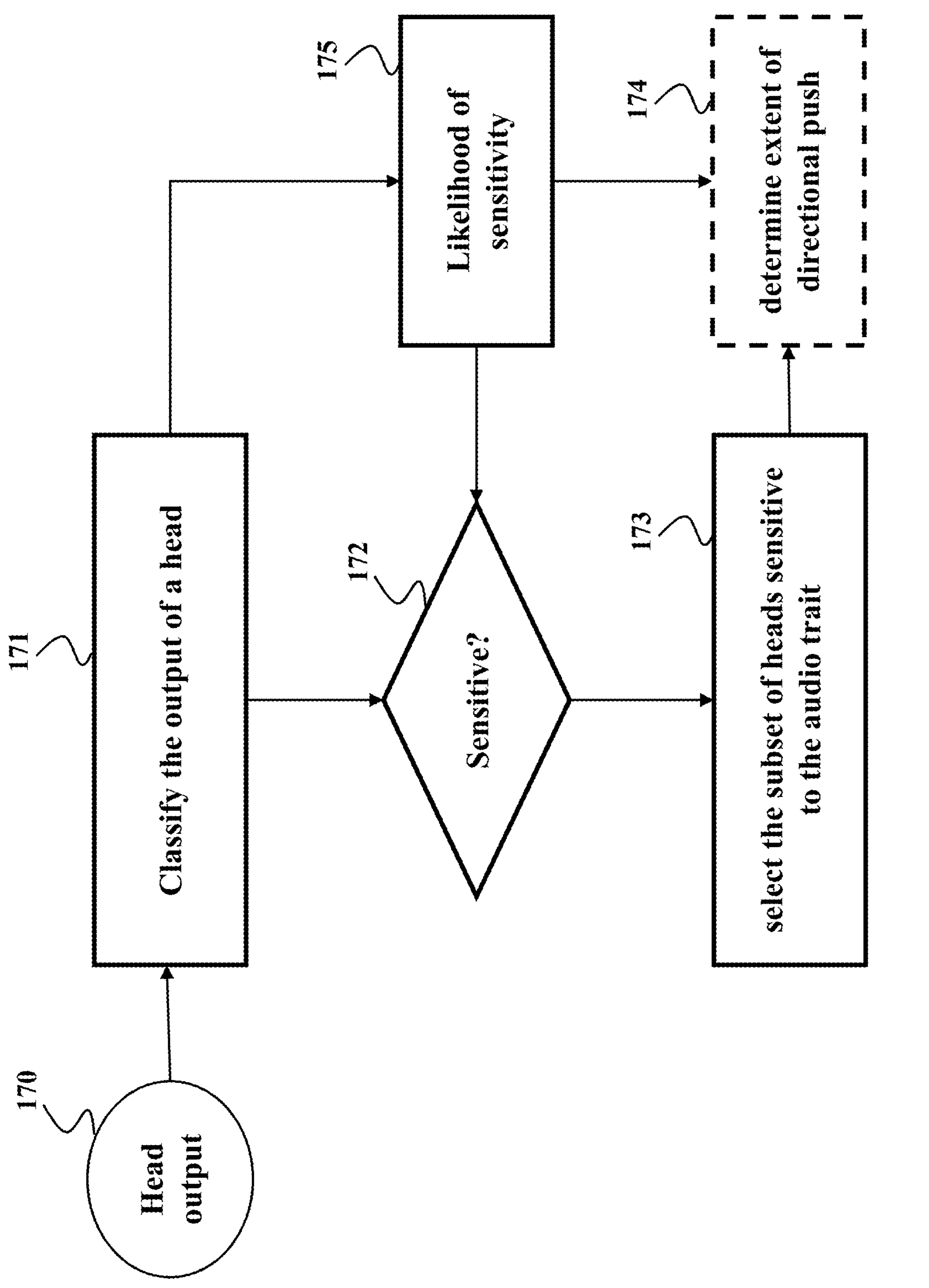
FIG. 1C shows a block diagram of a method for selecting and intervening on a specific attention head, which is sensitive to a particular trait according to some embodiments.

FIG. 1C shows a schematic of a method for selecting heads of the multi-head attention sensitive to a specific audio trait dynamically, i.e., during the execution of the generative audio transformer, according to some embodiments. In some embodiments, a classifier 171 is trained for each of the audio traits of interest and for each of the heads 170. For example, if the audio trait tuner is trained for 10 different audio traits and the autoregressive generative audio transformer has 100 different heads in all layers, the audio system 100 stores 1000 classifiers 171. In other words, there is a one-to-one mapping between the heads and the classifiers. Such classifiers are also referred to herein as classifier probes.

The classifier 171 classifies the output 170 of the corresponding head to estimate the likelihood 175 of the output already having the desired trait. The likelihood can be used to determine 172 the sensitivity of the output 170 to a specific audio trait to select 173 the subset of heads sensitive to the audio trait. Additionally or alternatively, the likelihood can be used to determine 174 extent of directional push, e.g., the size or the length of the bias vector.

Different embodiments use the classification in a soft and/or hard manner. For example, some implementations do not apply directional ITI when the likelihood of the output of a head already having the desired audio trait is above a threshold, i.e., more than 50%. Some embodiments apply the directional ITI all the time but the extent of the application, e.g., the length of the bias vector, depends on the likelihood. For example, the length of the bias vector pushing outputs having a 30% likelihood of possessing the desired audio trait is more than the length of the bias vector pushing outputs having 60% likelihood. Some embodiments use a combination of these approaches, by not applying directional ITI to the outputs already having the desired audio trait with high likelihood, and applying the directional ITI to other outputs by varying the length of the bias vector based on the likelihood of the classification.

Figure 1D:
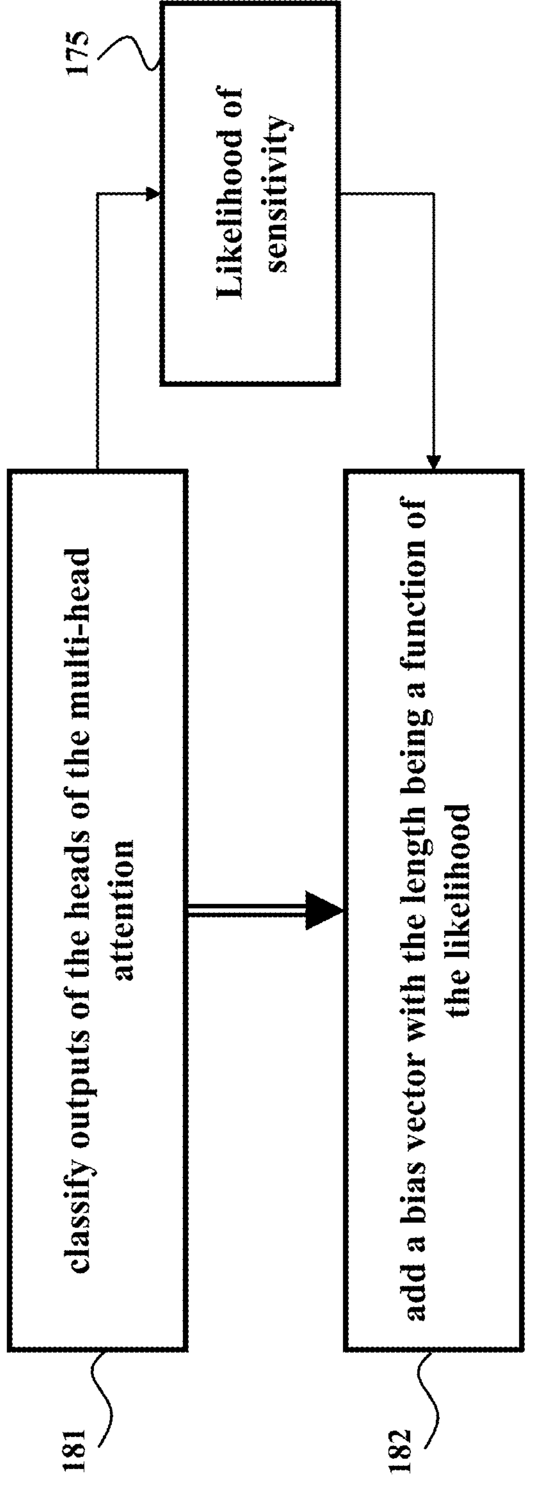
FIG. 1D shows a block diagram of a method for soft classification according to some embodiments.

FIG. 1D shows a block diagram of a method for soft classification according to some embodiments. In these embodiments, the audio trait tuner is configured to classify 181 outputs of the heads of the multi-head attention using classifiers to determine likelihoods 175 of corresponding outputs to possess the desired audio trait and add a bias 182 vector to each output of each head wherein the direction of the bias vector is predetermined for the desired audio trait, and wherein the length of the bias vector is a function of the likelihood 175.

Figure 1E:
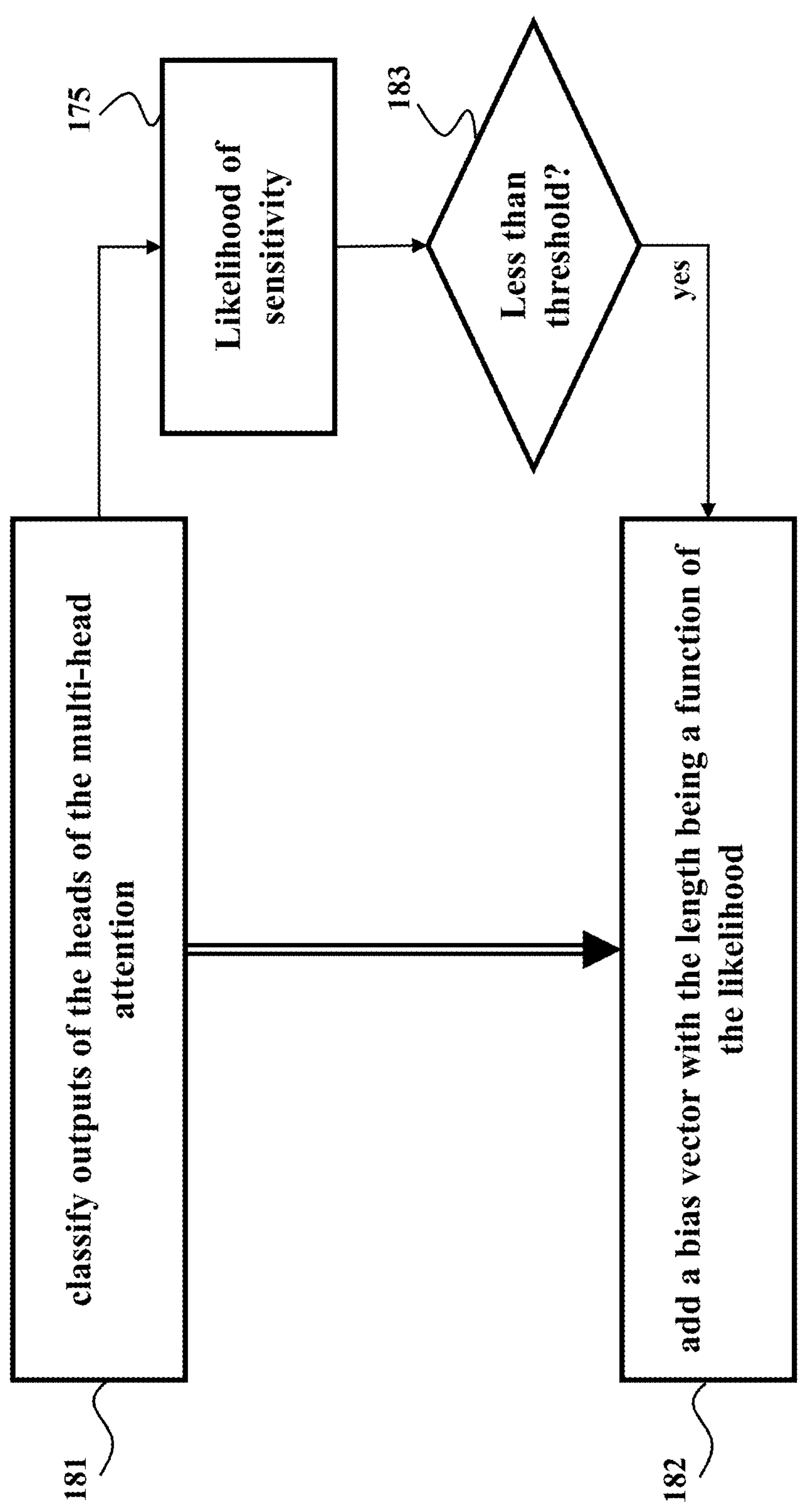
FIG. 1E shows a block diagram of a method for hard classification according to some embodiments.

FIG. 1E shows a block diagram of a method for hard classification according to some embodiments. In these embodiments, the audio trait tuner adds 182 a bias vector to each output of each head having the likelihood of possessing the desired audio trait less than a predetermined threshold 183.

In such a manner, different embodiments enable a self-monitoring process into the inference time intervention operation, such that the intervention is applied when the learned classifier probes indicate that the intervention is necessary based on the state of the generation network. This self-monitoring technique enables real-time assessment of whether the current generated sample incorporates the target intervention factor, allowing for the generation of non-divergent audio samples without a costly retraining or fine-tuning process. Given that most state-of-the-art generative audio transformers require customized hardware, large (often non-public) datasets, and cost extremely large sums of money and energy to train, the ability to create custom controls for these models, without re-training is crucial. Further, these custom controls can be created from a small number of audio examples (e.g., around 10) both with and without a desired audio trait. Given that text descriptions used in text-to-audio models may already be quite long, adding additional words regarding the custom control, may be insufficient. Furthermore, adding text does not allow for a "strength" control for a given trait of the generative model, thus, our intervention technique is required to obtain such fine-grained controls.

Figure 1F:
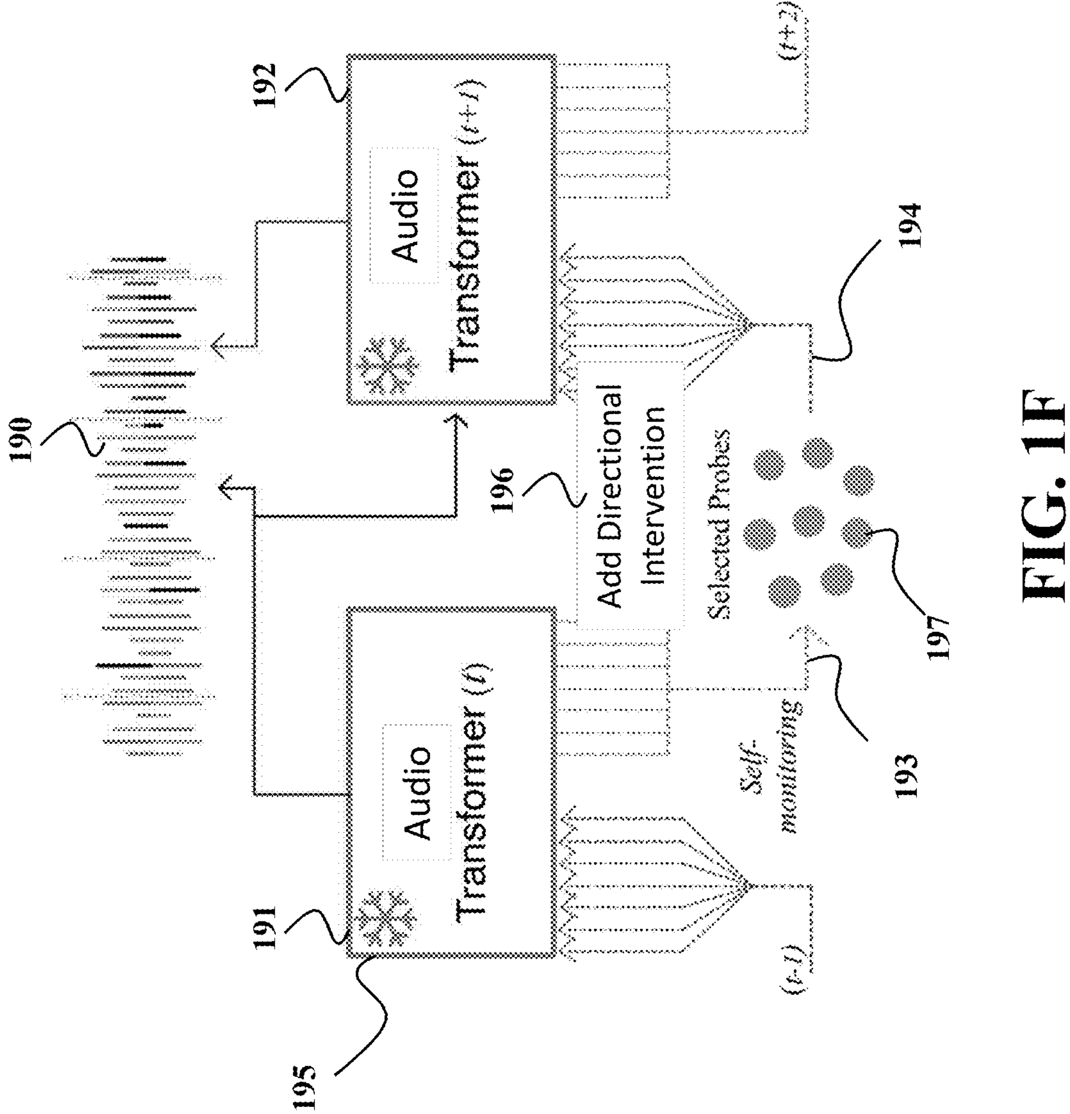
FIG. 1F provides an overall illustration of the execution and the audio transformer according to some embodiments.

FIG. 1F provides an overall illustration of the execution 191 and 192 of the audio transformer according to some embodiments. In some embodiments, an audio transformer is a large pre-trained model that generates an audio signal 190 based on a text description. Training such a generative model is difficult due to cost, hardware, and data constraints, so the model weights are frozen, as indicated by the snowflake 195. An audio transformer operates in an autoregressive manner similar to a large language model (LLM), but instead of generating a text token at each time step it generates an audio token representing a frame (i.e., several hundred samples representing a fraction of a second) of audio. Two time steps, t 191 and t+1 192 are shown in FIG. 1F. In order to apply fine-grained control to the audio transformer without re-training, the embodiments apply an intervention to different intermediate outputs of the audio generative model.

The intervention adds 196 directional biases to the output of a certain operation in the neural network that changes the overall behavior of the network. To ensure the applied interventions do not compromise the overall quality of the generated music, some embodiments monitor the outputs in the same places where we would apply the intervention 193, and then based on the monitoring outputs, only apply the intervention 194 when necessary. The decisions about where in the network to apply the intervention and where to monitor are based on probes 197, which are simple linear classifiers trained using a small dataset of audio examples some containing a desired trait (e.g., samples of music with and without a certain instrument). If the intervention is applied throughout the entire network, it can cause undesirable forgetting, and much of the knowledge learned during the training of the transformer can be lost. The probes identify, only those regions in the transformer most sensitive to the given characteristic from the small set of audio examples. The intervention and monitoring for the success of the intervention are then done only at those network regions identified by the probes.

FIG. 1G shows a mapping between different elements of the embodiments according to some implementations. In these embodiments, heads 186 of the multi-head attention are uniquely mapped for each of the different audio traits 185 to the directions 187. Additionally or alternatively, the heads 186 can be mapped to the classifiers 188 predetermined offline to define the directions 187 and/or the likelihood of the outputs of the heads 186 to possess the desired audio traits 185. For example, as explained below, the direction 11 of the classifier 11 can point from negative to positive examples of the outputs of the head 01.

Figure 2:
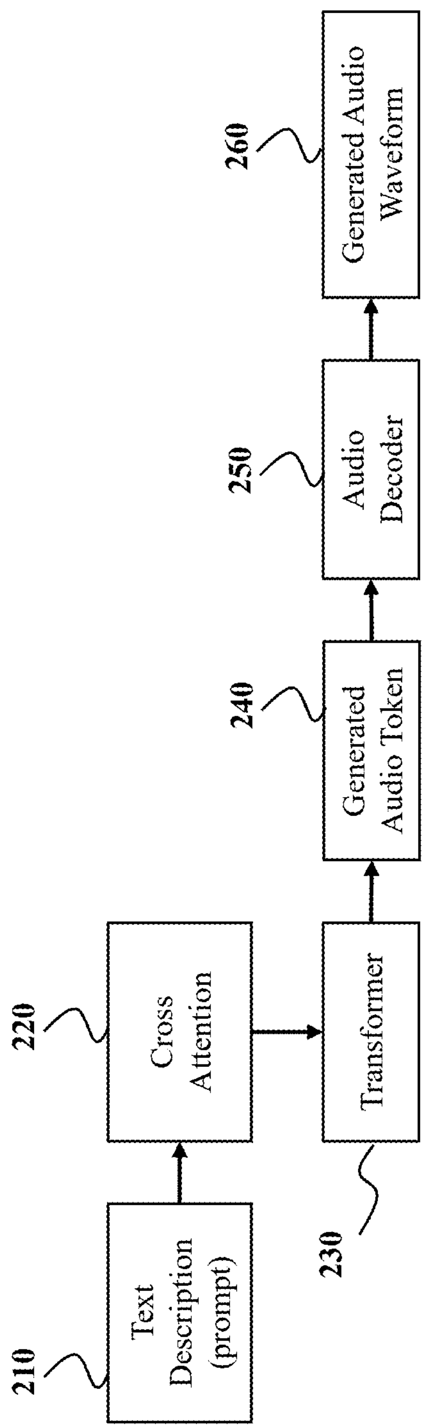
FIG. 2 illustrates an audio processing method in an implementation.

FIG. 2 shows a block diagram of the principles of operation of a text-to-audio audio transformer employed by some embodiments. The text-to-audio transformer 230 functions like an LLM, but instead of autoregressively generating words, it generates discrete audio tokens 240 from text prompts 210 using multi-head cross attention 220. These audio tokens 240 are converted to an audio waveform 260 using an audio decoder 250. The audio decoder is typically composed of a series of transposed convolution operations that expand the discrete embedding vector into an audio signal. In some implementations, 50 audio tokens 240 are generated for one second of an audio signal 260. Different from LLMs where both the input and output of the model are text, in a text-to-audio model, the text prompt input 210 is integrated into the transformer that generates audio tokens through a cross-attention process 220, which weights the words in the text prompt based on how important they are to the audio token 240 currently being generated.

Figure 3:
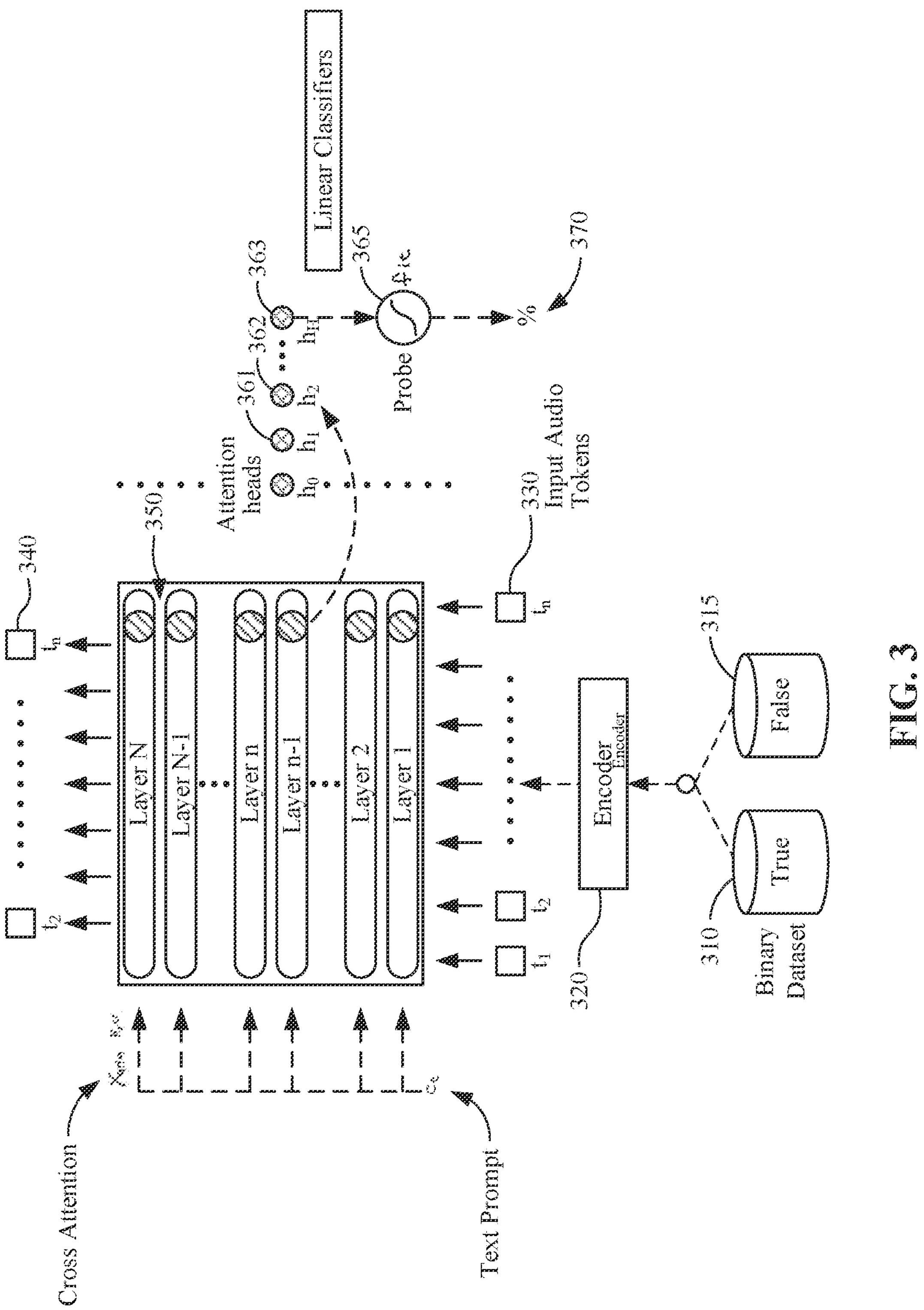
FIG. 3 shows a schematic of an audio transformer detailing the process of learning classifier probes according to some embodiments.

FIG. 3 shows a schematic of an audio transformer detailing the process of learning classifier probes according to some embodiments. The binary dataset includes a set of audio examples both with 310 and without 315 a certain audio characteristic. The embodiments then take each audio file from the binary dataset, and pass it through a convolutional encoder 320 to convert it into a sequence of discrete input audio tokens 330. These input audio tokens are then fed as input to the transformer 350, which is composed of multiple layers whose main computational component is a multi-head self-attention block. Each head in multi-head self-attention learns a different projection of the input, and the outputs of each head are concatenated before going through the remaining processing in the layer to produce the output audio tokens 340.

The individual attention heads, such as heads 361, 362, and 363, are the network computation blocks where the embodiments apply the intervention and monitor the success of the intervention. To that end, some embodiments train a simple linear classifier probe on the outputs of each attention head in each layer. For example, to train a classifier for head 363, Specifically, the embodiments collect the attention head output for the last element of the sequence of input audio tokens for each audio file in the binary dataset, and learn the linear classifier 365 to distinguish 370 between the true and false audio files from the binary dataset. Then based on how well the probe for each attention head is able to classify the audio characteristic from the binary dataset, the embodiments apply the intervention only to those attention heads whose probe has sufficient classification accuracy. This allows the trained transformer to maintain its overall performance but allows for surgical intervention to push the output along a given direction.

Figure 4:
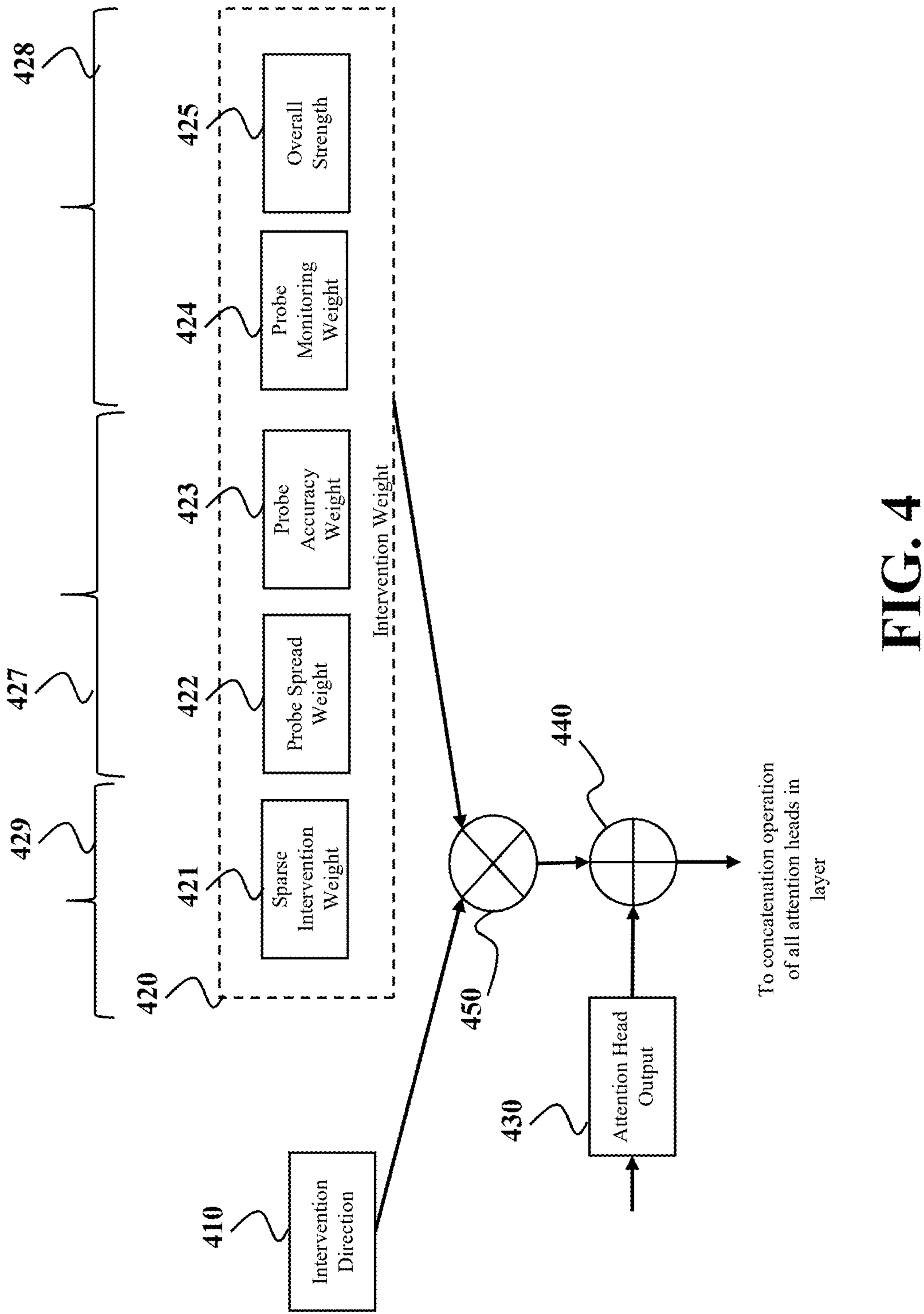
FIG. 4 shows a schematic of spatiotemporal ITI according to some embodiments.

FIG. 4 shows a schematic of spatiotemporal ITI according to some embodiments. The embodiments add 440 a bias term to the output 430 of each or at least some of the attention heads, where the bias term is a vector consisting of a the multiplication 450 of a direction 410 (intervention direction) and a length (intervention weight) 420. In different implementations, the intervention weight 420 is computed as the product of up to five different component weights, such as sparse intervention weight 421, probe spread weight 422, probe accuracy weight 423, probe monitoring weight 424, and overall strength 425 component weight.

In some implementations, the length 420 of the biased vector of the directional ITI is determined based on the offline 427 and online 428 components, as well as the hybrid component 429 that can be predetermined offline or estimated online. The offline component is based on a classifier trained for the desired audio trait to push the output of a specific head. Indeed, in some embodiments, the audio trait tuner is configured to classify outputs of the heads of the multi-head attention using classifiers trained in a supervised manner for corresponding heads to determine likelihoods of corresponding outputs to possess the desired audio trait, such that there is a one-to-one mapping between the heads, the classifiers, and the desired audio trait. The weights 420 are used to determine the length of a bias vector to be added to each output of each head wherein the length of the bias vector is a function of the likelihood. However, some weights can be determined online based on the performance of the classifier, i.e., determined as the function of the likelihood of the classifier to classify the output of the head to carry a desired audio trait. Examples of weights affecting the performance of the classifier and thus forming offline component 427 include a probe spread weight 422, and a probe accuracy weight 423.

Figure 7:
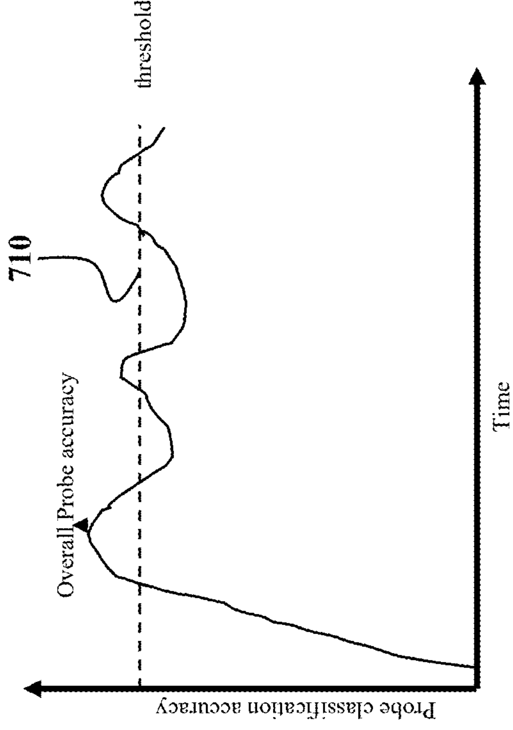
FIG. 7 shows a schematic illustrating the probe monitoring weight used by some embodiments.

However, some other weights are determined online, e.g., from the user input or any other desired characteristic of the performance of the audio system. For example, the overall strength 425 controls the overall amount of intervention to apply to the audio generative model. In practice, a user would control this value using a knob or a slider. The knob or slider determines an overall strength parameter, which is used as a parameter of a function to be applied to all attention heads to tune the strength of the applied intervention. In some embodiments, the same function is applied to all attention heads, and the overall strength parameter could be a scalar value which is multiplied with the intervention weights of all heads, or the overall strength parameter could be an exponent that raises the intervention weights of all heads to the power specified by the overall strength parameter. The probe monitoring weight 424 monitors in an online fashion all the attention heads identified by their corresponding probe as being sensitive to the trait we are trying to control. If the probes show that the trait is already present in the generated audio, then the embodiments do not apply intervention, reducing the risk of the intervention harming the quality of the pre-trained transformer. This is illustrated in FIG. 7.

The probe spread weight 422 considers that some attention heads have all data with a given trait tightly clustered, while others have more spread among the probe training samples. Some embodiments assign a head-specific weight based on the spread of the probe training data, which is described in more detail in relation to FIG. 9. The probe accuracy weight 423 controls applying a higher weight to attention heads whose learned probe can accurately classify the given audio trait. Some embodiments consider both hard and soft probe accuracy weighting strategies, as illustrated in FIG. 8.

The sparse intervention weight 421 considers the rate of skipping the intervention, and can be either pre-determined offline or varied online during generation. Because the generative music transformer models use an autoregressive generation process (i.e., previously generated outputs become input context for future generated samples), if the ITI intervenes on every generated sample the input context for subsequent generated samples will become flooded by samples with intervention applied, perhaps compromising the quality of the pre-trained model. This is illustrated in FIG. 6.

Figure 5:
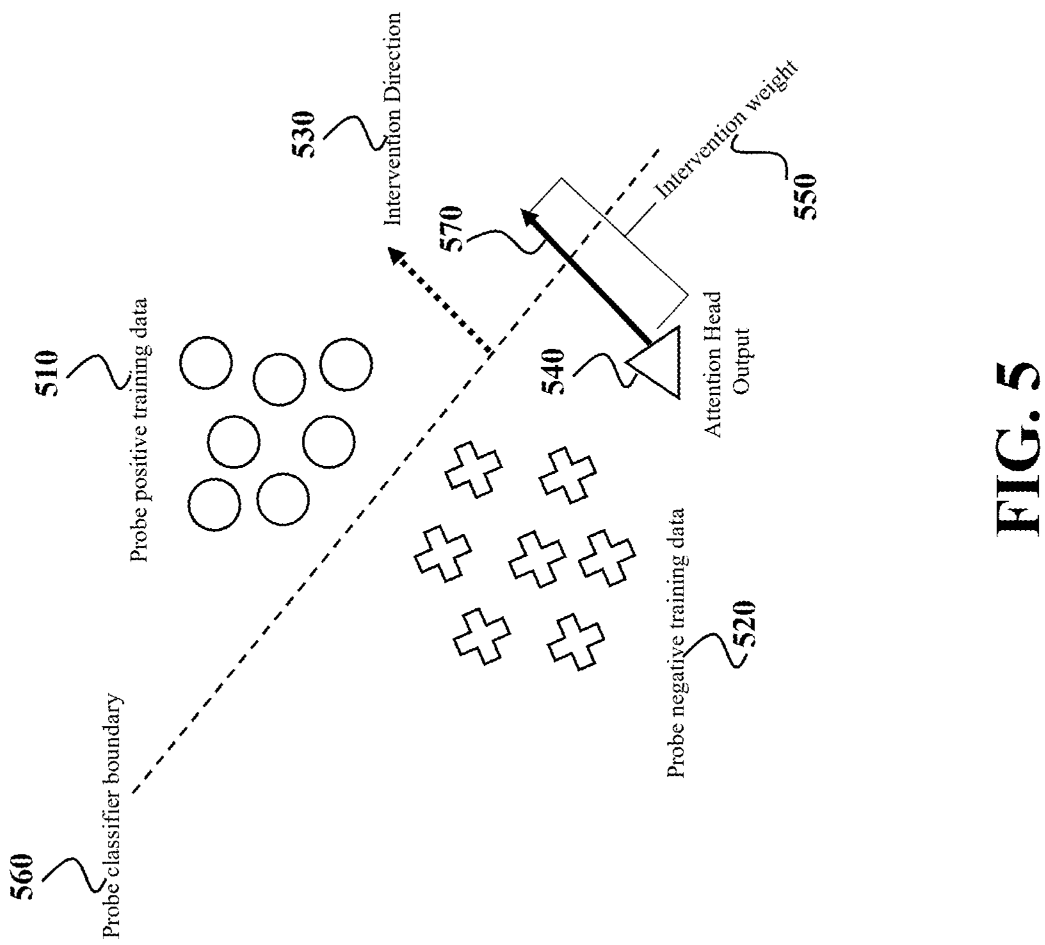
FIG. 5 shows a schematic illustrating the intervention direction for a single attention head according to some embodiments.

FIG. 5 shows a schematic illustrating the intervention direction for a single attention head according to some embodiments. The binary training dataset is represented as circles of positive examples 510 and x's of negative examples 520. The intervention direction 530 is then the orthogonal (i.e., perpendicular) direction of the learned linear classifier boundary 560 separating the positive and negative probe training data. During the directional ITI, the embodiments, move a sample attention head output 540 toward the positive training data using a bias vector 570 with the direction 530 and weight 550.

Figure 6:
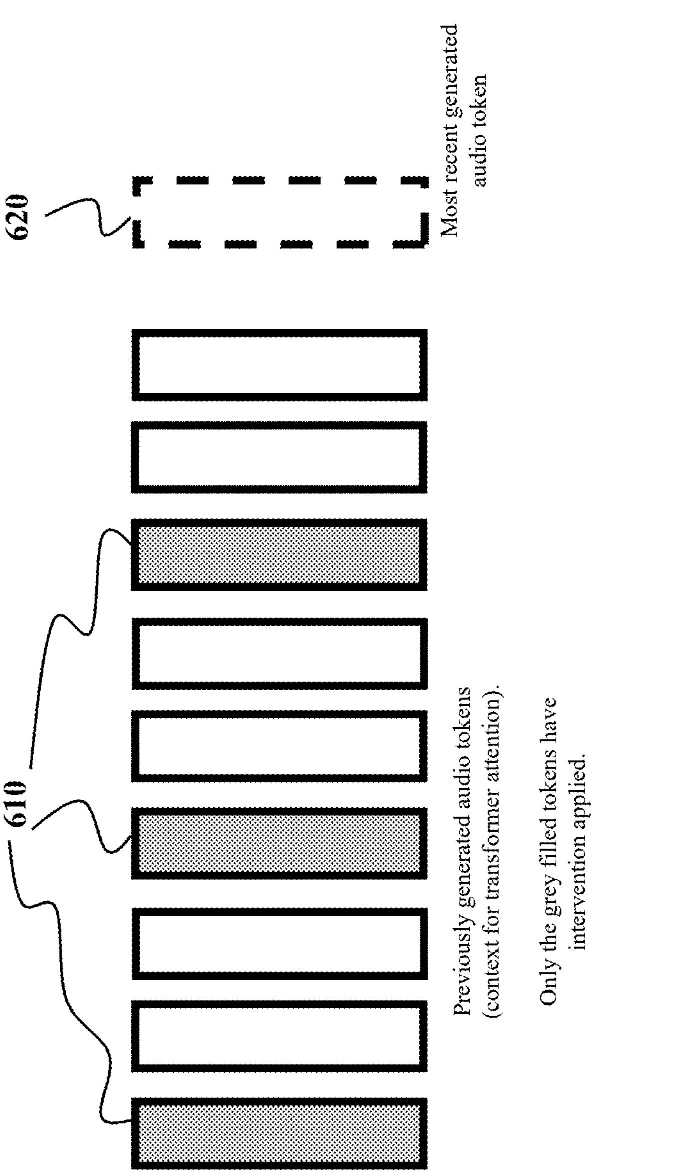
FIG. 6 shows a schematic illustrating the sparse intervention process used by some embodiments.

FIG. 6 shows a schematic illustrating the sparse intervention process used by some embodiments. By diminishing the intervention frequency across time steps, the embodiments allow the generation process to better align with the underlying rhythmic and temporal structure of the generated audio. In the embodiments of FIG. 6, the intervention weights are non-zero 610 once every s time steps, where s is a user-selected hyper-parameter. In such a manner, the audio trait tuner applies the directional ITI to a selected head 620 unless the directional ITI has been applied to a predetermined number of previous outputs of the selected head. In this example, hyper-parameter s is 3, so the directional ITI is applied to the head 620.

FIG. 7 shows a schematic illustrating the probe monitoring weight used by some embodiments. If the overall probe accuracy, computed on the currently generated audio, is already above a pre-specified threshold 710, then the probe monitoring weight is set to zero. Otherwise, the probe monitoring weight is proportional to the distance from the threshold, i.e., if the overall probe accuracy is far below the threshold the probe monitoring weight is larger. In some implementations, the overall probe accuracy is computed as the median accuracy over the top K attention heads recognized as having the particular audio trait. Additionally or alternately, some embodiments also compute the threshold in a dynamic fashion, that is if learning to classify the probe training dataset is generally more difficult, the embodiments lower the threshold as compared to an audio trait that can be more easily classified by the individual attention head probes.

Figures 8A, 8B:
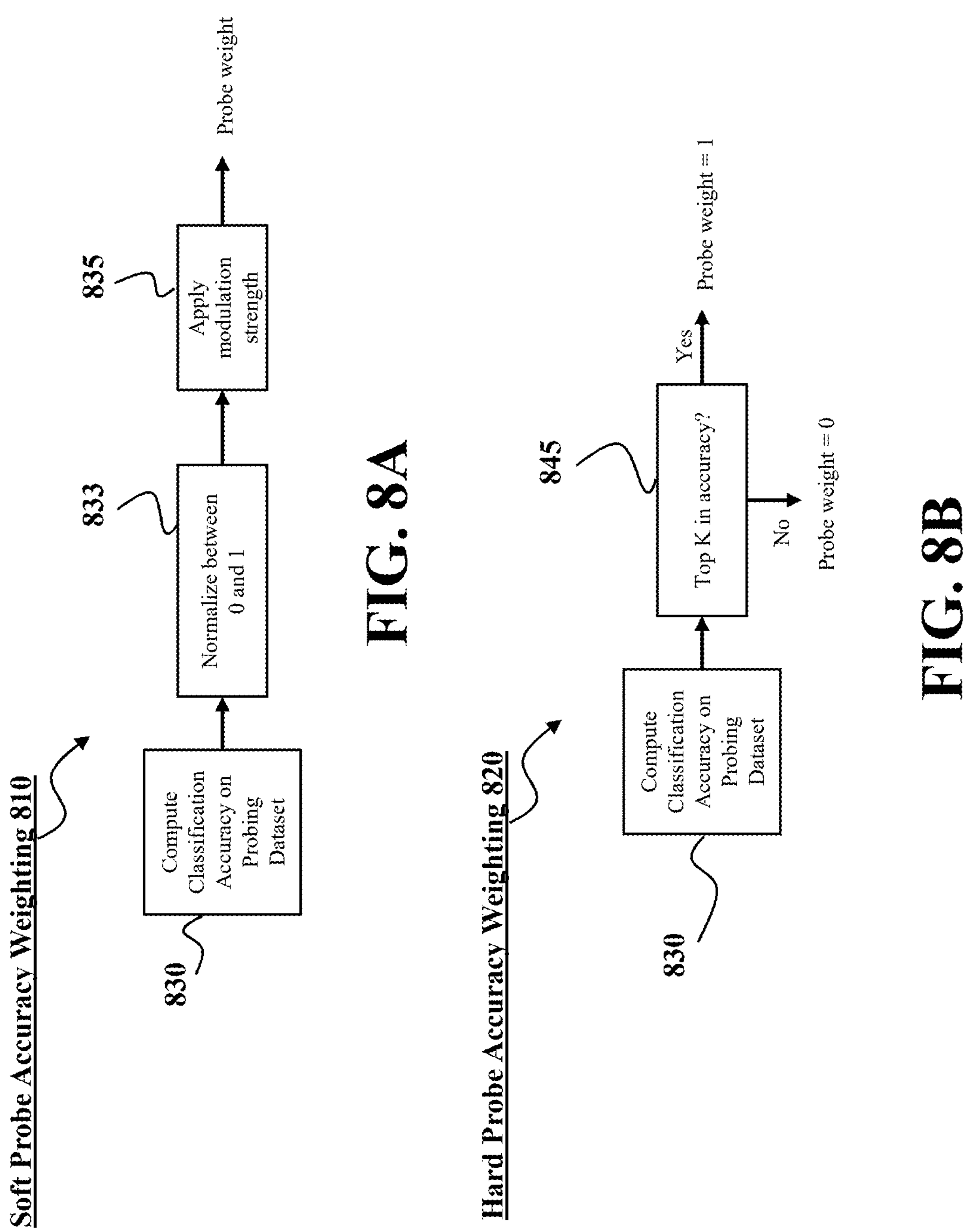
FIG. 8A and FIG. 8B show block diagrams of a method for computing the probe accuracy weight according to different embodiments.

FIG. 8A and FIG. 8B show block diagrams of a method for computing the probe accuracy weight according to different embodiments. It is an object of the embodiments to select attention heads that are better at classifying a certain audio trait to have a higher intervention weight and vice-versa. Different embodiments use both a soft 810 and a hard 820 weighting approach. The soft weighting approach normalizes 833 classification accuracy 830 of each attention head in the range between zero and one, such that the most accurate attention head in the entire model has a weight of 1 and the least accurate attention head a weight of 0. Optionally, some embodiments use the modulation strength 835, which is a greater than one. We can then raise each normalized probe accuracy weight by a factor greater than one to further increase the weight on accurate heads and decrease the weight on less accurate heads.

In contrast, the hard weighting approach 820 assigns 845 the predetermined weight, e.g., the weight of 1, to a predetermined number of heads with the most accurate classification.

Figure 9A:
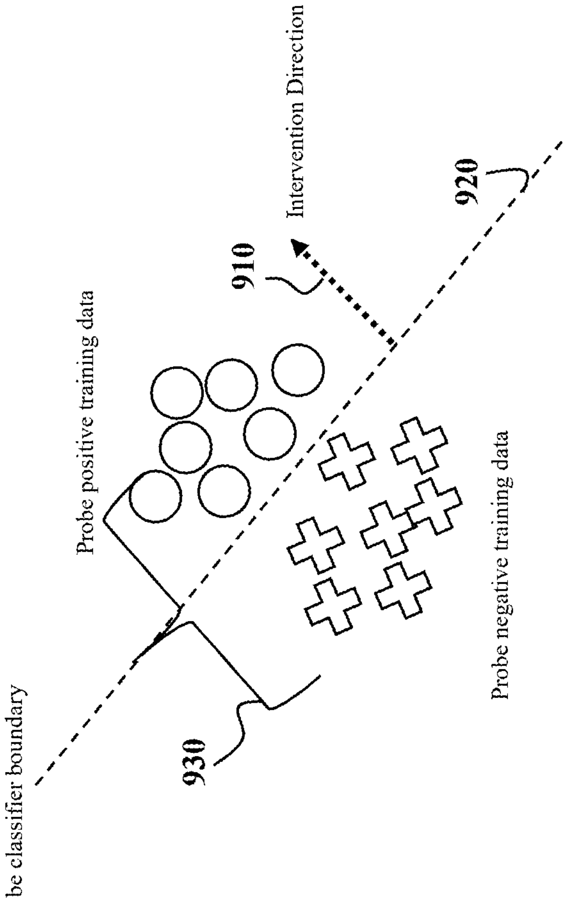
FIG. 9A and FIG. 9B show schematics illustrating the probe spread weight used by some embodiments.
Figure 9B:
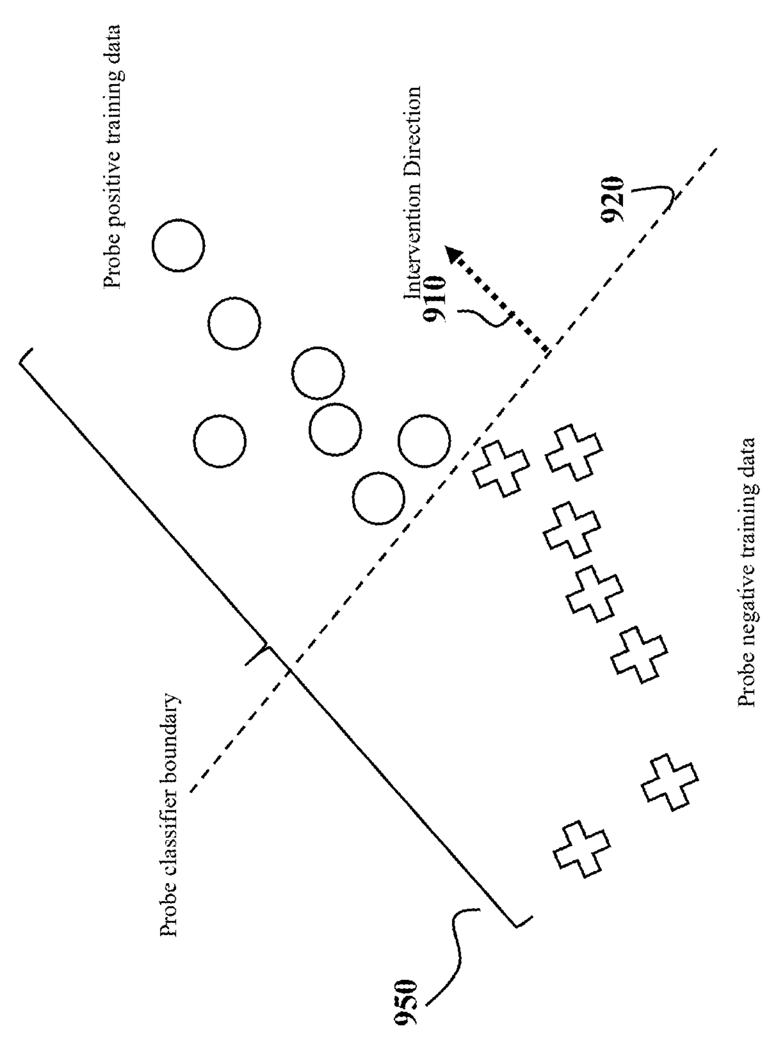

FIG. 9A and FIG. 9B show schematics illustrating the probe spread weight used by some embodiments. This weight is computed as the standard deviation over the binary probe training dataset (both positive and negative samples) along the intervention direction. In the example of FIG. 9A, most of the spread in the data is in the direction of the classifier boundary 920, and the spread 930 along the intervention direction 910 is quite low. As a result, this attention head is given a smaller probe spread weight. In the example of FIG. 9B, the data is much more spread 950 out along the intervention direction meaning this particular attention head will be given a larger probe spread weight. The probe spread weight helps make the intervention process more adaptable across the different heads and layers of the network, which have varying behaviors.

Figure 10:
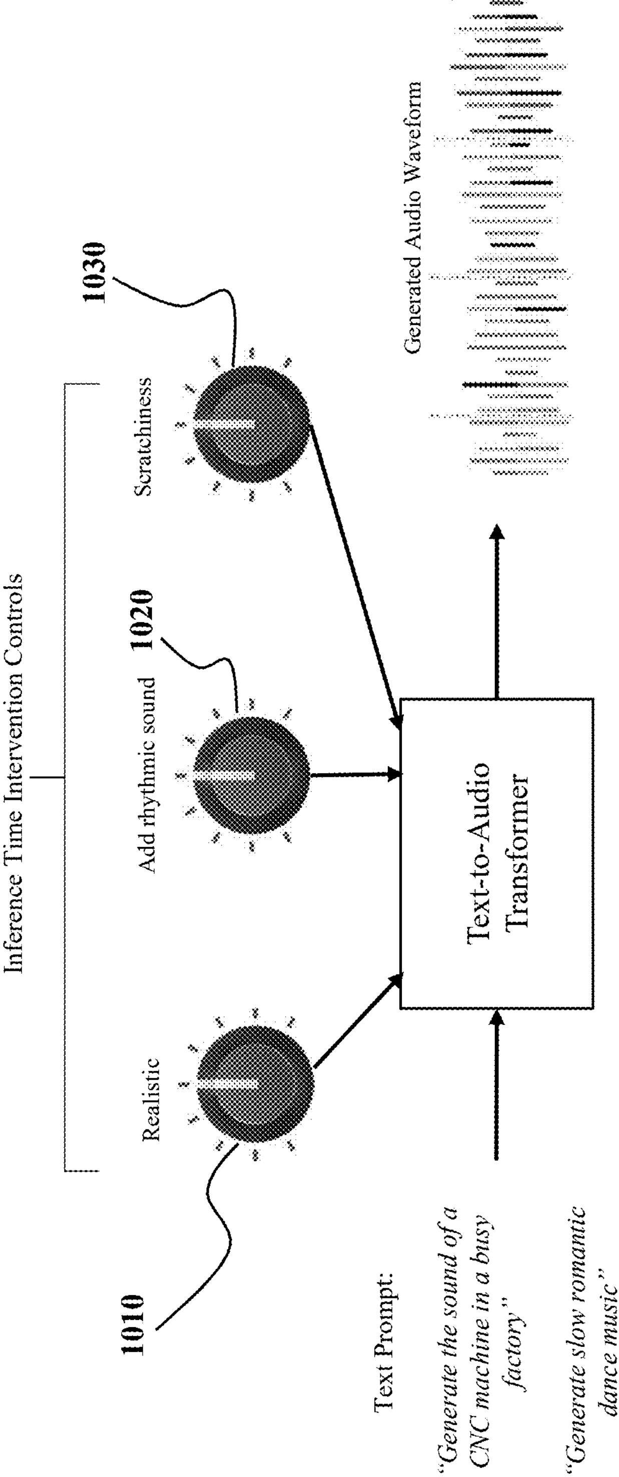
FIG. 10 illustrates an example of a user interface for using the inference time intervention technique to augment text-based control of a generative audio transformer according to some embodiments.

FIG. 10 illustrates an example of a user interface for using the inference time intervention technique to augment text-based control of a generative audio transformer according to some embodiments. First, notably, this interface allows multiple interventions applied simultaneously. This example provides intervention knobs for three audio traits: (1) Realistic 1010, i.e., does the audio sound like something recorded by a microphone or synthesized by an algorithm, (2) add rhythmic sound 1020, i.e., adding something like drums or tapping, and (3) scratchiness 1030, a high-frequency sound such as nails on a chalkboard. When the knobs are turned the "overall strength" 425 of the intervention weight 425 described in FIG. 4 is varied. This allows a user to vary the output of the generation process in an online manner.

Figure 11:
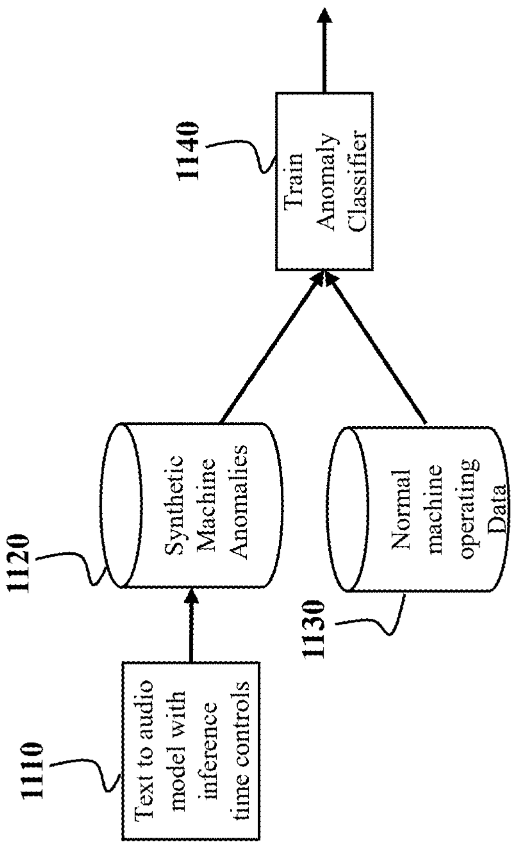
FIG. 11 shows a block diagram of an example of using the proposed inference time control for anomaly detection according to some embodiments.

FIG. 11 shows a block diagram of an example of using the proposed inference time control for anomaly detection according to some embodiments. In this example, the directional ITI is helping to build a more accurate model for detecting broken machine sounds in a factory. In particular, it is challenging to collect the sounds of anomalous or malfunctioning machines, because it requires purposefully damaging expensive machinery. However, these embodiments use a generative model 1110 to generate synthetic anomalous machine sounds 1120 using both text and inference time intervention controls, to generate synthetic anomalous sounds using knowledge of the physical process of the machine to build probing datasets, and generate a large amount of data by varying the overall intervention strength, but by including our proposed monitoring to ensure the data sounds realistic. The embodiments then train 1140 a classifier to distinguish between the normal machine sounds 1130, and the machine sounds combined with the realistic synthetic anomalies 1120 generated by the model 1110.

Examplar Embodiment Self-Monitored Inference-Time Intervention

Autoregressive Transformer Models

Architectures such as that of MusicGen currently form the foundation of state-of-the-art music generative models. These models are characterized by the autoregressive generation of a sequence of audio frames by transformer models. They include a collection of L multi-head self-attention layers (residual connections, normalization layers, and fully-connected feed-forward layers are employed as usual and not described here). At current time step t in the generated sequence, the l-th self-attention layer computes H self-attention heads $z_{l,h}(t) \in \mathbb{R}^D$ from an input vector $x_l(t) \in \mathbb{R}^{DH}$ as $$z_{l,h}(t) = Att\left(W_{l,h}^Q x_l(t),\ W_{l,h}^K x_l(1:t),\ W_{l,h}^V x_l(1:t)\right), \tag{1}$$

where $$x_l(1:t) = [x_l(1), \ldots, x_l(t)],\ W_{l,h}^Q,\ W_{l,h}^K, \text{ and } W_{l,h}^Q \tag{1}$$

denote the head-specific query, key, and value projection matrices, all in $\mathbb{R}^{D \times DH}$, and Att denotes the attention operator. The output vector $y_l(t) \in \mathbb{R}^{DH}$ is obtained by projecting back each head into DH-dimensional space and summing:

$$y_l(t) = \sum_{h=1}^{H} W_{l,h}^O z_{l,h}(t), \tag{2}$$

where $$W_{l,h}^O \in \mathbb{R}^{DH \times D}$$

is a projection matrix.

Inference-Time Intervention (ITI)

The output of the model could be somewhat controlled at inference by intervening in (i.e., modifying) the computation of the output of the multi-head self-attention layer in Eq. (2). This intervention is done by adding a term to the heads $z_{l,h}(t) \in \mathbb{R}^D$ before the projection:

$$y_l(t) = \sum_{h=1}^{H} W_{l,h}^O (z_{l,h}(t) + \alpha w_{l,h} \cdot \sigma_{l,h} \theta_{l,h}) \tag{3}$$

where $\theta_{l,h} \in \mathbb{R}^D$ is a vector representing the head-specific ITI "direction" in the D-dimensional head-specific space, $\sigma_{l,h} \in \mathbb{R}^+$ is a head-specific normalization of $\theta_{l,h}$ (also referred to as the probe spread weight), $\alpha \in \mathbb{R}^+$ is the system-wide ITI strength, and $w_{l,h} \geq 0$ is a head-specific strength weighting.

The head-specific ITI directions $\theta_{l,h}$ are obtained through classifier probes. Some embodiments are based on recognizing that a side probing dataset can be used to train a classifier mirroring our ITI goal (e.g., drum classifier if the goal is to add drums). The examplar embodiments run the dataset through our (frozen) generation network and collect a set of heads $z_{l,h}(t)$ for all l,h. For each l and h, the embodiment then train a distinct logistic regression classifier probe with parameters $\tilde{\theta}_{l,h}$, whose prediction is obtained as sigmoid $(\langle \tilde{\theta}_{l,h}, z_{l,h}(t) \rangle)$. Once training is complete, the embodiments set ITI direction $\theta_{l,h}$ as the final $\tilde{\theta}_{l,h}$, and $\sigma_{l,h}$ as the standard deviation of $\langle \theta_{l,h}, z_{l,h}(t) \rangle$ for all $z_{l,h}(t)$ obtained on the combined probing training and testing data. The embodiment also takes note of the final classifier accuracy $acc_{l,h}$ on the probing test data. In the case of MusicGen, the embodiments apply the generative model in unconditional generation mode for probing, as probing dataset generally lacks text queries for its audio samples.

In the embodiments, head-specific weights $w_{l,h}$ are set by finding the top-K heads in terms of classifier probe accuracy $acc_{l,h}$, setting their $w_{l,h}$ to 1 and the others to 0. For example, the most effective $\alpha$ and K can be found by hyperparameter grid search.

Sparse Intervention

For example, for the task of audio continuation, the embodiments observe that ITI often leads to changes that are too abrupt to be musically plausible (see Section 3.3). As mitigation, the embodiments propose to diminish the ITI frequency across time steps, potentially allowing the generation process to better align with the underlying rhythmic structure of the generated music. This corresponds to replacing the ITI weights $w_{l,h}$ in Eq. (3) by time-varying weights $w_{l,h}(t)$, which can only be non-zero for $t=t_0+$ is, $i \in \mathbb{N}$, where to is an intervention start time and s represents the number of steps between each ITI (e.g., s=5 to perform ITI every 5 time steps). The value of $w_{l,h}(t)$ for $t=t_0+$ is can be set by another criterion, such as the original one based on top-K heads.

Soft-Weigthing

One limitation addressed by the embodiments is to leave the number K of heads on which ITI is performed (i.e., the number of pairs (l,h) for which $w_{l,h}(t) \neq 0$) as hyperparameter to tune. The embodiments additionally propose a hyperparameter-free soft-weighting approach based on the collected probe accuracies $acc_{l,h}$, and show that it is sufficient to perform effective ITI. In practice, we propose setting the weights as $$w_{l,h}(t) = \left(\frac{acc_{l,h} - acc_{min}}{acc_{max} - acc_{min}}\right)^c, \tag{4}$$

with $acc_{min}$ and $acc_{max}$ the minimum and maximum accuracies recorded across all l and h, and c a power factor allowing to modulate the relative weights of heads with accurate vs. inaccurate classifier probes (we use c=3). By construction, $w_{l,h}(t)$ is guaranteed to fall between 0 and 1.

Automated Intervention Modulation by Self-Monitoring

The embodiments expect a system capable of modulating the ITI strength to be most effective, as systems with time-invariant $w_{l,h}$ (t) make no use of (and, as such, cannot react to) the state of the inference model during generation. To that end, the embodiments use the classifier probes to drive such a modulation. The embodiments first define as $\mathcal{H}_K$ the set of top-K heads (l,h) by probe classifier accuracy. For each new generation time step, the embodiments collect the set $\mathcal{C}$ (t) of output predictions of the classifier probes for all heads in $\mathcal{H}_K$ before intervening on them, i.e., $$C(t) = \{\text{sigmoid}(\langle \theta_{l,h}, z_{l,h}(t) \rangle) \mid (l, h) \in \mathcal{H}_K\}. \tag{5}$$

The statistics of $\mathcal{C}(t)$ reflect the confidence of the probes regarding the success of the intervention. By comparing them to the baseline accuracies obtained on the probing training data, we can devise a modulation scheme to update $w_{l,h}(t)$. The embodiments compute the median $\mathcal{C}(t)=\text{med}(\mathcal{C}(t))$ and the change in this median since the prior generation step with intervention, $\Delta(t)=\mathcal{C}(t)-\mathcal{C}(t-s)$.

The embodiments then define a threshold based on the median and standard deviation of the set $\mathcal{A}$ of probe accuracies $acc_{l,h}$ on the probing training data over the same heads $\mathcal{H}_K$, $$\mathcal{A}=\{acc_{l,h} \mid (l,h)\in\mathcal{H}_K\}, \tag{6}$$

setting the threshold as $\tau=\text{med}(\mathcal{A})-\text{std}(\mathcal{A})$.

The update algorithm is then defined following:

For the first generation time step with ITI $t_0$, $w_{l,h}(t_0)$ is set following Eq. (4), and we set $\Delta(t_0)\leftarrow 0$, For each subsequent generation time step with ITI t+s, we have 3 cases:

if $\mathcal{C}(t)<\tau$ and $w_{l,h}(t)>0$, we set $$w_{l,h}(t+s)\leftarrow w_{l,h}(t)\cdot(1-\Delta(t)), \tag{7}$$

(b) if $\mathcal{C}(t)<\tau$ but $w_{l,h}(t)=0$, reset to the initial value $$w_{l,h}(t+s)\leftarrow w_{l,h}(t_0), \tag{8}$$

(c) if $\mathcal{C}(t)\geq\tau$, we set $w_{l,h}(t+s)\leftarrow 0$.

Figure 12:
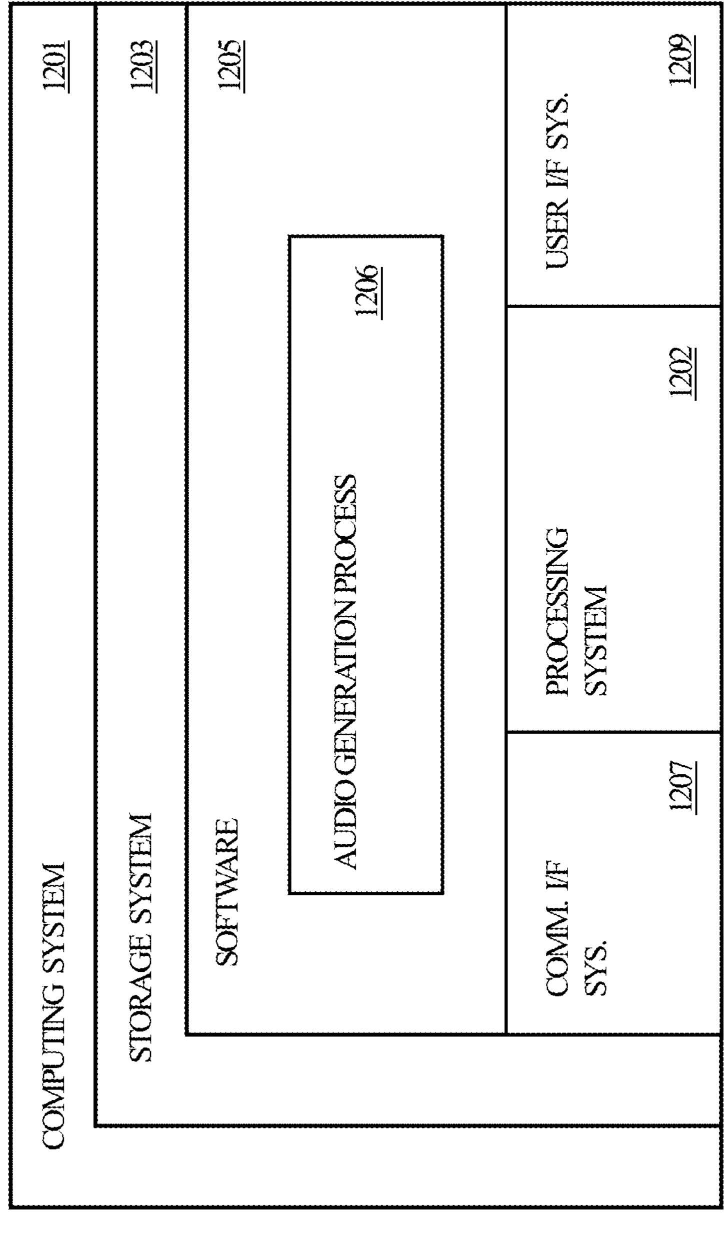
FIG. 12 illustrates a computing system suitable for implementing the various operational environments, architectures, processes, scenarios, and sequences discussed below with respect to the other Figures.

FIG. 12 illustrates a computing device 1201 that is representative of any system or collection of systems in which the various processes, programs, services, and scenarios disclosed herein may be implemented. Examples of computing device 1201 include but are not limited to, desktop and laptop computers, tablet computers, mobile computers, audio devices, and wearable devices. Examples may also include server computers, web servers, cloud computing platforms, and data center equipment, as well as any other type of physical or virtual server machine, container, and any variation or combination thereof.

Computing device 1201 may be implemented as a single apparatus, system, or device or may be implemented in a distributed manner as multiple apparatuses, systems, or devices. Computing device 1201 includes, but is not limited to, processing system 1202, storage system 1203, software 1205, communication interface system 1207, and user interface system 1209. Processing system 1202 is operatively coupled with storage system 1203, communication interface system 1207, and user interface system 1209.

Processing system 1202 loads and executes software 1205 from storage system 1203. Software 1205 includes and implements audio generation process 1206, which is representative of the above-described embodiments. When executed by processing system 1202, software 1205 directs processing system 1202 to operate as described herein for at least the various processes, operational scenarios, and sequences discussed in the foregoing implementations. Computing device 1201 may optionally include additional devices, features, or functionality not discussed for purposes of brevity.

Referring still to FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general-purpose central processing units, graphical processing units, digital signal processors, application-specific processors, and logic devices, as well as any other type of processing device, combinations, or variations thereof.

Storage system 1203 may comprise any computer-readable storage media readable by processing system 1202 and capable of storing software 1205. Storage system 1203 may include volatile and nonvolatile, removable, and non-removable media implemented in any method or technology for storage of information, such as computer-readable instructions, data structures, program modules, or other data. Examples of storage media include random access memory, read-only memory, magnetic disks, optical disks, flash memory, virtual memory and non-virtual memory, magnetic cassettes, magnetic tape, magnetic disk storage, or other magnetic storage devices, or any other suitable storage media. In no case is the computer-readable storage media a propagated signal.

In addition to computer-readable storage media, in some implementations storage system 1203 may also include computer-readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including audio generation process 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing the inference and training processes described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing device 1201 is representative) overall from a general-purpose computing system into a special-purpose computing system customized to perform inference and/or training in an optimized manner. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer-readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well-known and need not be discussed at length here.

Communication between computing device 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software-defined networks, data center buses and backplanes, or any other type of network, a combination of networks, or a variation thereof. The aforementioned communication networks and protocols are well-known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

The invention claimed is:

1. An audio system for synthesizing audio sounds having a desired audio trait, comprising:

a processor coupled to a memory storing instructions implementing executable modules of the audio system, the modules comprising:

an input interface configured to collect inputs for synthesizing audio and data indicative of a desired audio trait in the synthesized audio;

an autoregressive generative audio transformer trained for generating the audio by processing the inputs with one or more layers employing multi-head attention;

an audio trait tuner configured to use directional inference-time intervention (ITI) to push at least some outputs of at least some heads of the multi-head attention into directions predetermined for each of the at least some heads according to the desired audio trait; and an output interface configured to output the audio generated by the autoregressive generative audio transformer;

wherein the audio trait tuner is configured to:

classify the outputs of the heads using classifiers trained in a supervised manner for corresponding heads, such that there is a one-to-one mapping between the heads and the classifiers; and select a subset of heads sensitive to the desired audio trait based on the classification;

wherein the subset of heads is determined during the execution of the autoregressive generative audio transformer.

2. The audio system of claim 1, wherein the directional ITI adds a bias vector pointing to the predetermined direction to an output of a head before applying an activation function of a neuron of the head to the output.

3. The audio system of claim 1, wherein the input interface is configured to accept a plurality of audio traits, each of the audio traits is associated with a set of directions predetermined for a set of heads, wherein the multiple audio traits include a first audio trait associated with a first set of directions predetermined for a first subset of heads and a second trait associated with a second set of directions predetermined for a second subset of heads, wherein the first subset of heads is different from the second subset of heads, wherein the first and the second subsets of heads include a first head and a second head with different directions predetermined for the first and the second audio trait.

4. The audio system of claim 3, further comprising:

a user interface configured to enable a selection of one or multiple of the plurality of audio traits, wherein, upon selection of the first trait or the second trait, the audio trait tuner is configured to push outputs of the first subset of heads into corresponding directions from the first set of directions or push outputs of the second subset of heads into corresponding directions from the second set of directions.

5. The audio system of claim 3, further comprising:

a user interface configured to enable a selection of one or multiple of the plurality of audio traits, wherein, upon selection of the first trait and the second trait, the audio trait tuner is configured to push outputs of the first subset of heads into corresponding directions from the first set of directions and push outputs of the second subset of heads into corresponding directions from the second set of directions.

6. The audio system of claim 1, wherein the audio trait tuner selects a subset of heads producing outputs sensitive to the desired audio trait and sparsely applies the directional ITI to the selected heads by skipping applying the directional ITI to the selected heads at some instances of time.

7. The audio system of claim 6, wherein the audio trait tuner applies the directional ITI to a selected head unless the directional ITI has been applied to a number of previous outputs of the selected head.

8. The audio system of claim 6, wherein the subset of heads producing outputs sensitive to the desired audio trait is predetermined offline.

9. The audio system of claim 6, wherein the subset of heads producing outputs sensitive to the desired audio trait is determined online during the execution of the autoregressive generative audio transformer based on outputs of the heads of the multi-head attention.

10. The audio system of claim 1, wherein the audio trait tuner is configured to classify outputs of the heads of the multi-head attention using classifiers trained in a supervised manner for corresponding heads to determine likelihoods of corresponding outputs to possess the desired audio trait; and add a bias vector to each output of each head wherein the direction of the bias vector is predetermined for the desired audio trait, and wherein the length of the bias vector is a function of the likelihood.

11. The audio system of claim 10, wherein the length of the bias vector for the directional ITI of an output of a head includes an offline component determined offline based on weights determined as the function of the likelihood of the classifier to classify the output of the head to carry a desired audio trait, and an online component determined during execution of the audio system.

12. The audio system of claim 11, wherein the weights of the online component include a probe monitoring weight, and the weights of the offline component include a probe accuracy weight and a probe spread weight.

13. The audio system of claim 1, wherein the audio trait tuner is configured to classify at least some outputs of the heads of the multi-head attention using classifiers trained in a supervised manner for corresponding heads to determine a likelihood of corresponding outputs possessing the desired audio trait; and add a bias vector to each output of each head having the likelihood of possessing the desired audio trait less than a predetermined threshold, wherein a direction of the bias vector is predetermined for the desired audio trait, and wherein a length of the bias vector is a function of the likelihood.

14. The audio system of claim 1, wherein the desired audio trait indicates a sound indicative of anomalous operation of a machine.

15. The audio system of claim 1, wherein the inputs for synthesizing audio include text, such that the audio system is a text-to-audio generative system.

16. The audio system of claim 1, wherein the inputs for synthesizing audio include an audio signal to be continued, such that the audio system is an audio continuation generative system.

17. A method for synthesizing audio sounds having a desired audio trait, wherein the method uses a processor coupled with stored instructions implementing steps of the method, comprising:

collecting inputs for synthesizing audio and data indicative of a desired audio trait in the synthesized audio;

executing an autoregressive generative audio transformer trained for generating the audio by processing the inputs with multiple layers employing multi-head attention;

using directional inference-time intervention (ITI) to push at least some outputs of at least some heads of the multi-head attention into a direction predetermined for the desired audio trait; and outputting the audio generated by the autoregressive generative audio transformer tuning one or more desired audio traits by classifying the outputs of the heads using classifiers trained in a supervised manner for corresponding heads, such that there is a one-to-one mapping between the heads and the classifiers; and selecting a subset of heads sensitive to the desired audio trait based on the classification;

wherein the subset of heads is determined during the execution of the autoregressive generative audio transformer.

18. The method of claim 17, wherein the directional ITI adds a bias vector pointing to the predetermined direction to an output of a head before applying an activation function of a neuron of the head to the output.

19. The method of claim 17, further comprising: accepting a plurality of audio traits, each of the audio traits is associated with a set of directions predetermined for a set of heads, wherein the multiple audio traits include a first audio trait associated with a first set of directions predetermined for a first subset of heads and a second trait associated with a second set of directions predetermined for a second subset of heads, wherein the first subset of heads is different from the second subset of heads, wherein the first and the second subsets of heads include a first head and a second head with different directions predetermined for the first and the second audio trait; pushing outputs of the first subset of heads into corresponding directions from the first set of directions; and pushing outputs of the second subset of heads into corresponding directions from the second set of directions.

* * * * *